US012595901B1

(12) United States Patent
Zhang

(10) Patent No.: US 12,595,901 B1
(45) Date of Patent: Apr. 7, 2026

(54) MOUNTING STRUCTURE FOR FAN LAMP

(71) Applicant: Shengnan Zhang, Jingmen (CN)

(72) Inventor: Shengnan Zhang, Jingmen (CN)

( * ) Notice: Subject to any disclaimer, the term of this patent is extended or adjusted under 35 U.S.C. 154(b) by 0 days.

(21) Appl. No.: 19/307,121

(22) Filed: Aug. 22, 2025

(30) Foreign Application Priority Data

Aug. 5, 2025 (CN) ......................... 202521658643.5

(51) Int. Cl.

| | |
|---|---|
| ***F21V 33/00*** | (2006.01) |
| ***F21S 8/06*** | (2006.01) |
| ***F21V 21/03*** | (2006.01) |
| ***F21V 21/116*** | (2006.01) |
| ***F21V 23/06*** | (2006.01) |

(52) U.S. Cl.
CPC ............. *F21V 21/116* (2013.01); *F21S 8/063* (2013.01); *F21V 21/03* (2013.01); *F21V 23/06* (2013.01); *F21V 33/0096* (2013.01)

(58) Field of Classification Search
CPC ......... F21V 17/18; F21V 17/12; H01R 31/00; H01R 33/94; F21K 9/235; F21K 9/237
See application file for complete search history.

(56) References Cited

U.S. PATENT DOCUMENTS 1,062,920 A * 5/1913 Jones ..................... H01R 33/94 439/300
1,567,436 A * 12/1925 Happ ...................... F04D 25/10 310/40.5
2,186,674 A * 1/1940 Hildebrand .............. H02K 7/14 310/91
5,421,701 A * 6/1995 Funston ................ F04D 25/022 416/5
12,421,984 B1 * 9/2025 Xu ...................... F21V 33/0096

FOREIGN PATENT DOCUMENTS

CN 221780608 U * 9/2024

OTHER PUBLICATIONS

Search English translation of CN 221780608 U (Year: 2024).*

* cited by examiner

*Primary Examiner* — Omar Rojas Cadima
(74) *Attorney, Agent, or Firm* — Jose Cherson Weissbrot

(57) ABSTRACT

The present application relates to a mounting structure for a fan lamp. The mounting structure for the fan lamp includes a connecting rod, a mount and a fastening screw. The connecting rod includes a first connecting portion, and an external thread is provided on the first connecting portion; the mount includes a first mounting member and a second mounting member connected to the first mounting member, the first mounting member is internally hollow, an internal thread is provided on the first mounting member corresponding to the first connecting portion, and the external thread is threadedly engaged with the internal thread to threadedly connect the first mounting member to the first connecting portion body; and the fastening screw passes through the first mounting member and the first connecting portion to securely connect the connecting rod to the mount.

9 Claims, 5 Drawing Sheets

MOUNTING STRUCTURE FOR FAN LAMP

TECHNICAL FIELD

The present application relates to the technical field of fan lamps, and in particular to a mounting structure for a fan lamp.

BACKGROUND

A fan lamp is a common indoor lighting and air-blowing structure. At present, the fan lamp available on the market generally uses a threaded structure of a lamp base to screw with a lamp holder to realize mechanical connection and to bear the overall weight of the fan lamp and a force generated during operation. This mounting method has a certain application history in light and small-sized fan lamps, and is characterized by simple mounting and strong versatility. Moreover, the fan lamp mounted in this way is prone to loosening or falling off during long-term use.

SUMMARY

An embodiment of the present application provides a mounting structure for a fan lamp, including:

- a connecting rod including a first connecting portion, an external thread being provided on the first connecting portion;
- a mount including a first mounting member and a second mounting member, the first mounting member being internally hollow, an internal thread being provided on the first mounting member corresponding to the first connecting portion, the external thread being threadedly engaged with the internal thread to threadedly connect the first mounting member to the first connecting portion, the second mounting member being connected to the first mounting member, and an end of the second mounting member away from the first mounting member being used for fixing to a wall; and
- a fastening screw passing through the first mounting member and the first connecting portion to securely connect the connecting rod to the mount.

BRIEF DESCRIPTION OF THE DRAWINGS

In accompanying drawings, the same reference signs denote the same or similar components or elements throughout multiple drawings unless otherwise specified. These drawings are not necessarily drawn to scale. It should be understood that these drawings depict only some implementations according to the present application and should not be construed as limiting the scope of the present application.

LIST OF REFERENCE SIGNS

Figure 1:
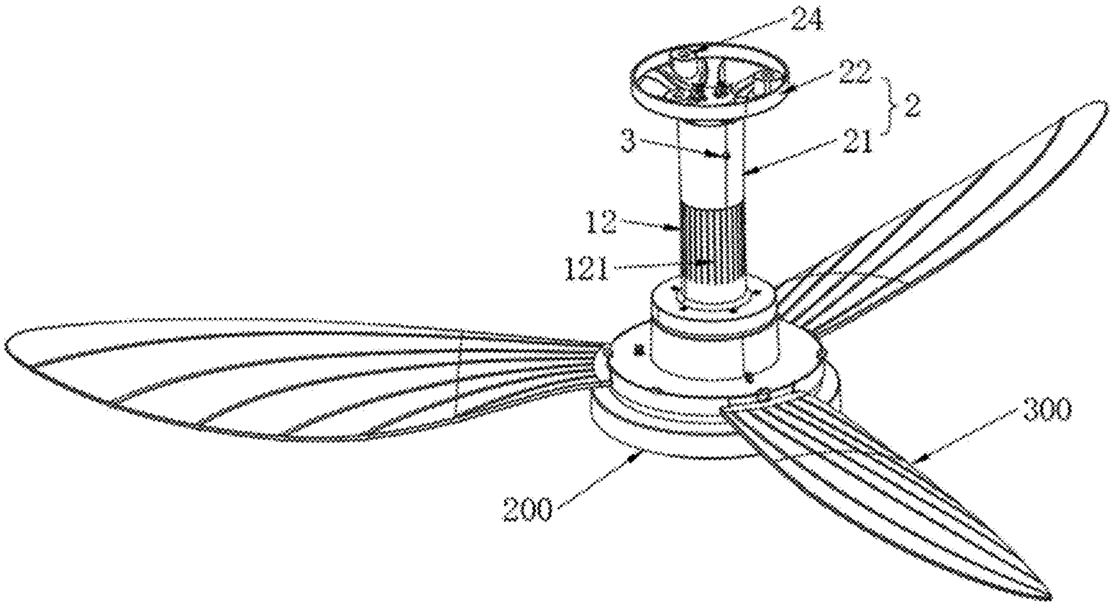
FIG. 1 is a structural schematic diagram of a fan lamp according to an embodiment of the present application.

100. Mounting structure for fan lamp; 1. Connecting rod; 11. First connecting portion; 111. External thread; 112. Blind hole; 12. Second connecting portion; 121. Anti-slip pattern; 13. Protruding column; 14. Projecting ring; 15. Gap; 2. Mount; 21. First mounting member; 211. Internal thread; 212. Through hole; 22. Second mounting member; 23. Conductive elastic piece; 24. Screw mounting position; 3. Fastening screw; 4. Lamp base; 41. Outer wall; 200. Fan assembly; 300. Bulb assembly.

DETAILED DESCRIPTION OF EMBODIMENTS

Various different implementations or embodiments carrying out the subject matter and technical solutions are disclosed as follows. To simplify the disclosure, specific examples of elements and arrangements will be described below. Of course, these examples are merely exemplary, and are not intended to limit the scope of protection of the present application. For example, a first feature recorded later in the specification being formed above or over a second feature can include an implementation of forming a direct contact of the first and second features, and can also include an implementation of forming an additional feature between the first feature and the second feature such that the first and second features may not be in direct contact. In addition, reference numerals and/or letters may be repeated in different examples in the disclosure. This repetition is for the sake of brevity and clarity, and does not itself represent the relationship between the various implementations and/or structures to be discussed. Further, when a first element is described as being connected or coupled to a second element, the description includes an implementation in which the first and second elements are directly connected or coupled to each other, and also includes an implementation in which the first and second elements are indirectly connected or coupled to each other by using one or more other intervening elements.

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

Figure 2:
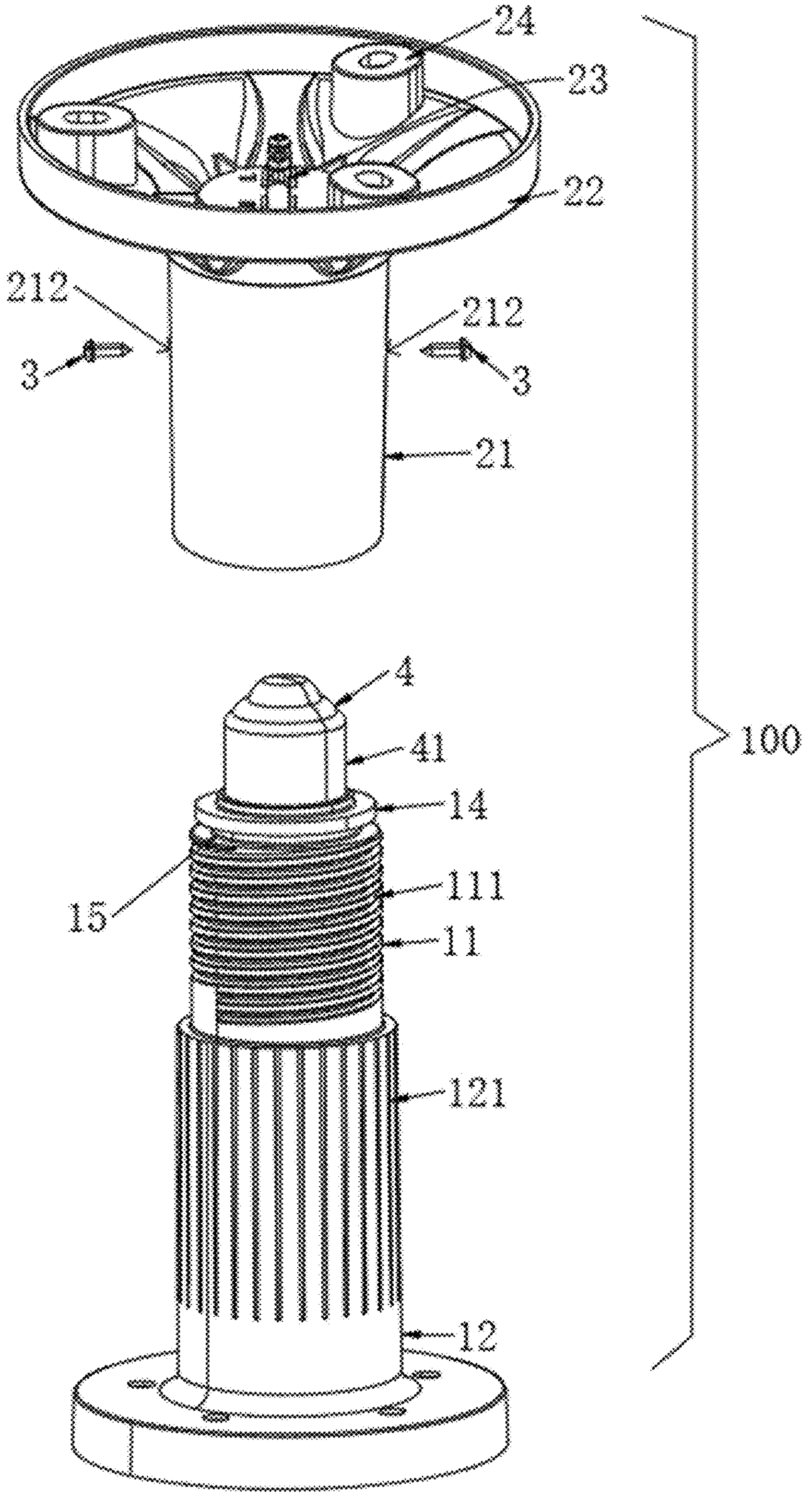
FIG. 2 is a structural schematic diagram of a mounting structure for the fan lamp according to an embodiment of the present application.
Figure 3:
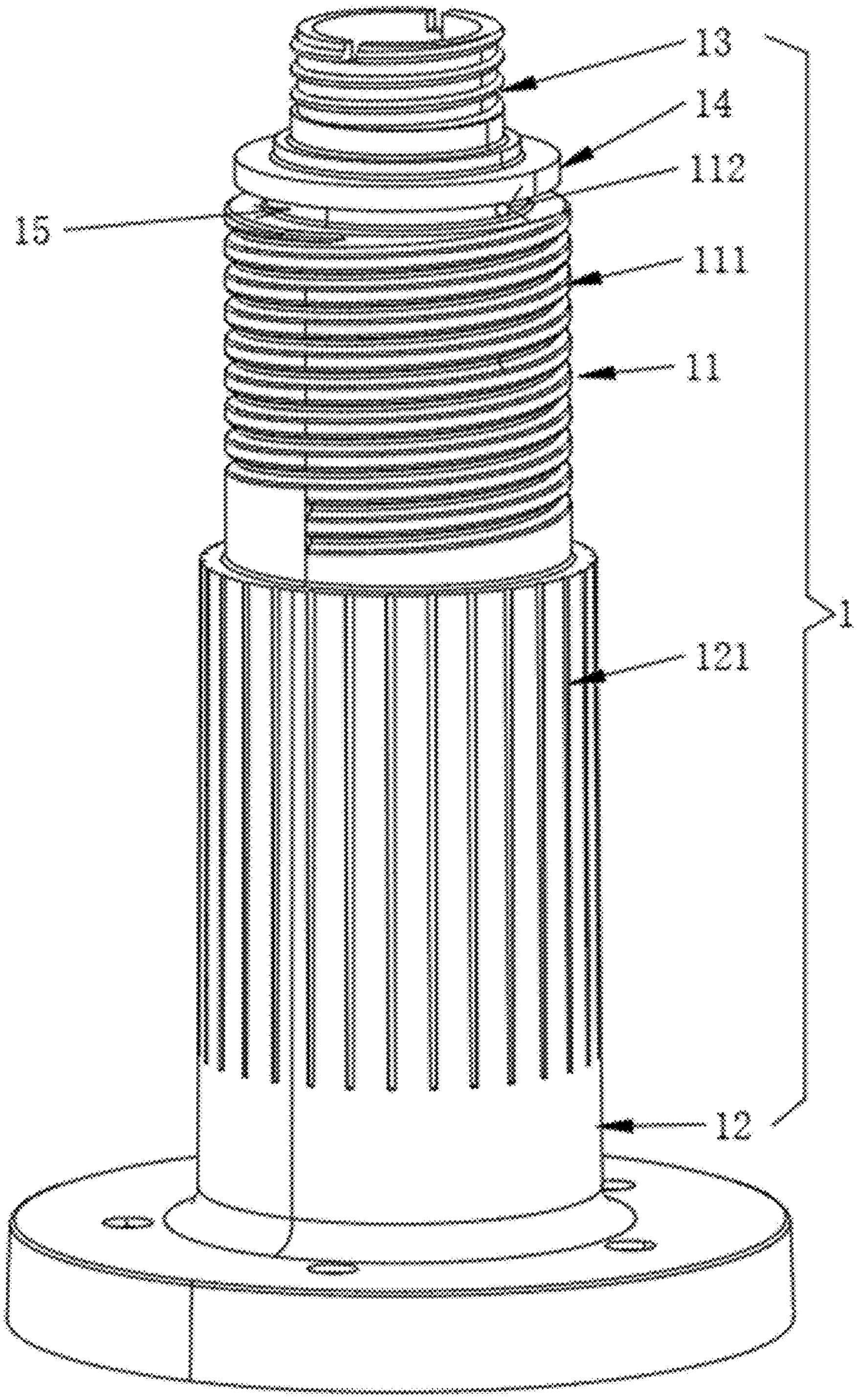
FIG. 3 is a structural schematic diagram of a connecting rod of the mounting structure for the fan lamp according to an embodiment of the present application.
Figure 4:
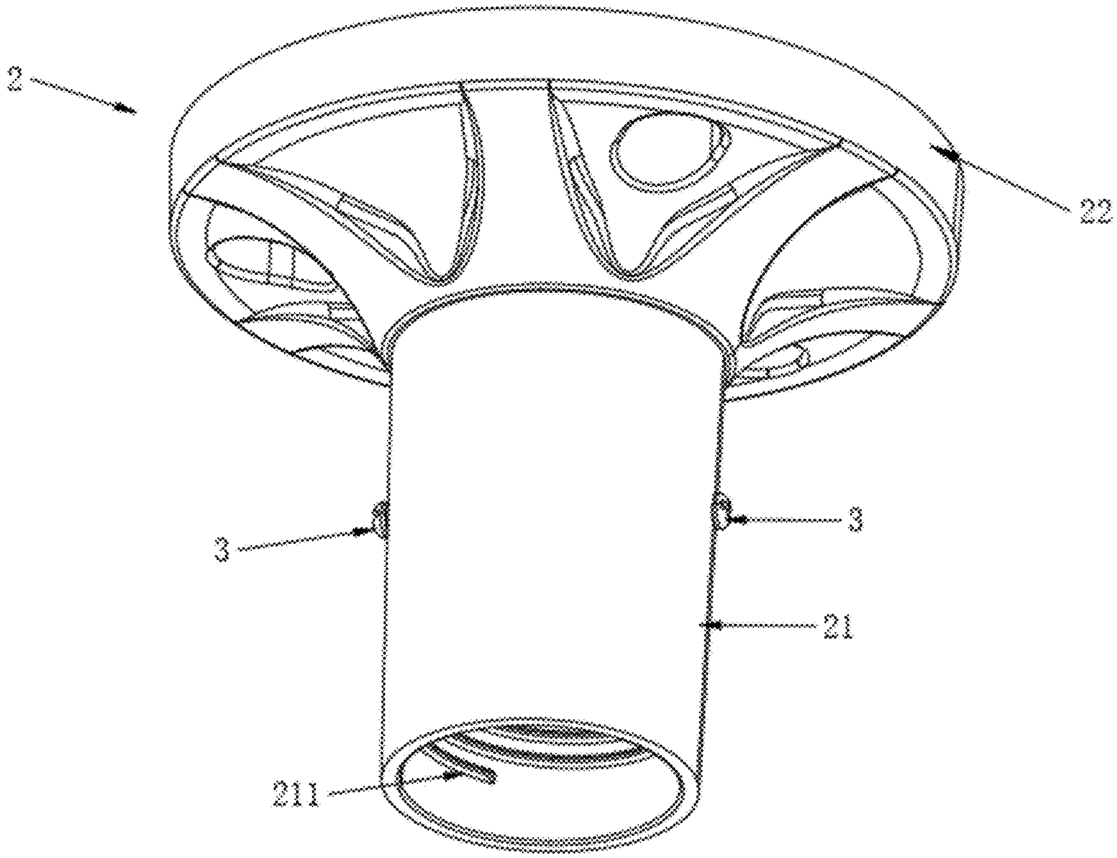
FIG. 4 is a structural schematic diagram of a mount of the mounting structure for the fan lamp according to an embodiment of the present application.
Figure 5:
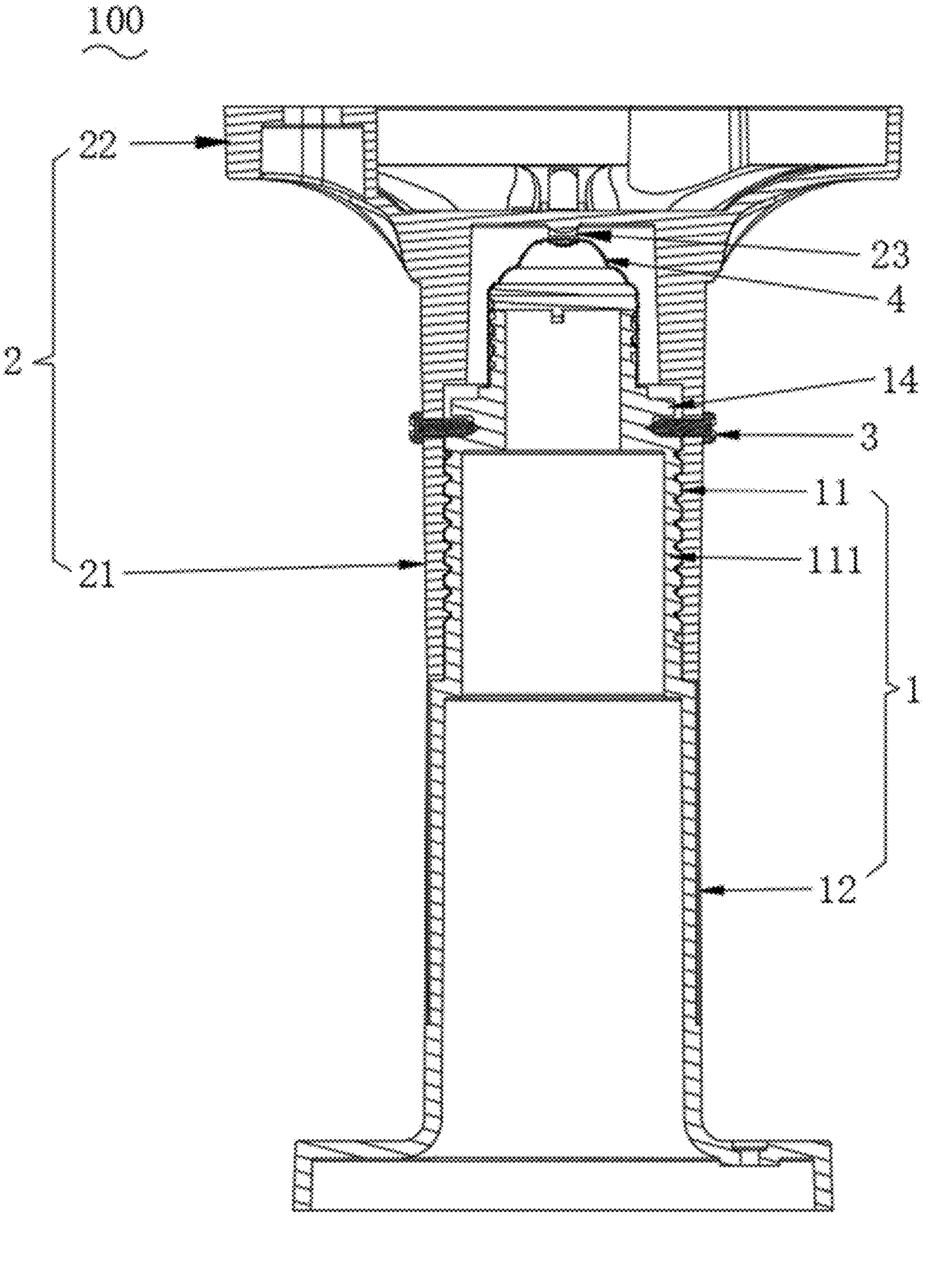
FIG. 5 is a schematic diagram of a sectional structure of the mounting structure for the fan lamp according to an embodiment of the present application.

Referring to FIGS. 1 to 5, the present application provides a mounting structure 100 for a fan lamp. The mounting structure includes a connecting rod 1, a mount 2 and a fastening screw 3. The connecting rod 1 includes a first connecting portion 11, and an external thread 111 is provided on the first connecting portion 11; the mount 2 includes a first mounting member 21 and a second mounting member 22 connected to the first mounting member 21, the first mounting member 21 is internally hollow, an internal thread 211 is provided on the first mounting member 21 corresponding to the first connecting portion 11, the external thread 111 is threadedly engaged with the internal thread 211 to threadedly connect the first mounting member 21 to the first connecting portion 11, and an end of the second mounting member 22 away from the first mounting member 21 is used for fixing to a wall; and the fastening screw 3 passes through the first mounting member 21 and the first connecting portion 11 to securely connect the connecting rod 1 to the mount 2. Each of the external thread 111 and the internal thread 211 is of a double-thread and double-pitch structure, which takes into account the installation efficiency and the connection reliability, ensuring both quick assembly and connection strength.

In the mounting structure 100 for the fan lamp according to the present application, the connecting rod 1 includes the first connecting portion 11, and the external thread 111 is provided on the first connecting portion 11; the mount 2 includes the first mounting member 21, the internal thread 211 is provided on the first mounting member 21 corresponding to the first connecting portion 11, and the external thread 111 is threadedly engaged with the internal thread 211 to threadedly connect the first mounting member 21 to the first connecting portion 11, that is, the connecting rod 1 and the mount 2 are securely connected by the threads, which makes the assembly and disassembly convenient; and the fastening screw 3 passes through the first mounting member 21 and the first connecting portion 11 to further realize the secure connection between the connecting rod 1 and the mount 2 and ensure that the fan lamp may not loosen or fall off during long-term use, which is also applicable to large-sized fan lamps with forward and reverse rotation functions, thus ensuring the safety of use.

Referring to FIGS. 1 to 5, in some embodiments, the mounting structure 100 for the fan lamp further includes a lamp base 4. The connecting rod 1 includes a protruding column 13, the protruding column 13 is connected to the first connecting portion 11, the protruding column 13 is arranged toward the mount 2, the lamp base 4 is mounted on the protruding column 13, and an outer wall 41 of the lamp base 4 is a smooth surface. The outer wall 41 of the traditional lamp base 4 is a threaded surface. In the mounting structure 100 for the fan lamp according to the present application, the outer wall 41 of the lamp base 4 is a smooth surface. This arrangement ensures that a user cannot mistakenly mount the lamp base 4 directly on a lamp holder on the wall. Instead, the fan lamp can only be mounted by using structures such as the mount 2 and the connecting rod 1 provided in the present application, preventing user misoperation and thus ensuring the stability and safety of use.

Further, a conductive clastic piece 23 is mounted in the mount 2, and when the first mounting member 21 is threadedly connected to the first connecting portion 11, the lamp base 4 abuts against the conductive elastic piece 23 to electrically connect the lamp base 4 to the conductive elastic piece 23. When the first mounting member 21 is threadedly connected to the first connecting portion 11 in place, the lamp base 4 abuts against the conductive elastic piece 23 inside the mount 2, thereby achieving the electrical connection therebetween. This electrical conduction method is convenient and efficient.

Referring to FIGS. 1 to 5, in some embodiments, there are two fastening screws 3, the first mounting member 21 is an internally hollow barrel, two through holes 212 are provided in a side wall of the barrel, two blind holes 112 are provided in the first connecting portion 11 corresponding to the two through holes 212, and the fastening screws 3 sequentially pass through and are threadedly connected to the through holes 212 and the blind holes 112. In order to enable the two fastening screws 3 to be uniformly stressed when the fan lamp rotates, the two fastening screws 3 are arranged on two opposite sides of the first mounting member 21, respectively. It will be understood that in other embodiments, there may also be other numbers of fastening screws 3, such as three or four, and the fastening screws 3 are evenly distributed along a periphery of the first mounting member 21, which ensures that each fastening screw 3 is uniformly stressed, thereby effectively preventing the screws from loosening or falling off during long-term use, and helping to prolong the service life of the fan lamp.

Referring to FIGS. 1 to 5, in some embodiments, the first connecting portion 11 is a cylinder, the external thread 111 is arranged on a periphery of the cylinder, a projecting ring 14 is provided at a top of the cylinder, there is a gap 15 between the projecting ring 14 and the external thread 111, and the blind holes 112 are arranged at the gap 15. The blind holes 112 are arranged at the gap 15 and hence do not occupy the arrangement space of the external thread 111, ensuring that the external thread 111 can be smoothly threadedly engaged with the internal thread 211 of the first mounting member 21 without interference.

Referring to FIGS. 1 to 5, in some embodiments, the connecting rod 1 further includes a second connecting portion 12, the second connecting portion 12 is connected to an end of the first connecting portion 11 away from the mount 2, and an anti-slip pattern 121 is provided on a periphery of the second connecting portion 12. The provision of the anti-slip pattern 121 facilitates gripping and screwing of the second connecting portion 12 by the user.

Further, the second connecting portion 12 is of a cylindrical structure, and the second connecting portion 12 has a greater diameter than the first connecting portion 11. The second connecting portion 12, the first connecting portion 11 and the protruding column 13 are of an integrally formed structure. An end of the second connecting portion 12 away from the first connecting portion 11 is used for mounting a fan assembly 200 and a bulb assembly 300.

Referring to FIGS. 1 to 5, in some embodiments, the second mounting member 22 is of a disk-shaped structure, and a plurality of screw mounting positions 24 are provided on the second mounting member 22 for fixing the second mounting member 22 to the wall. Specifically, screws are driven into the wall after passing through the screw mounting positions 24, so as to fix the second mounting member 22 to the wall.

The above technical solution has at least the following advantages or beneficial effects.

In the mounting structure 100 for the fan lamp according to the present application, the connecting rod 1 includes the first connecting portion 11, and the external thread 111 is provided on the first connecting portion 11; the mount 2 includes the first mounting member 21, the internal thread 211 is provided on the first mounting member 21 corresponding to the first connecting portion 11, and the external thread 111 is threadedly engaged with the internal thread 211 to threadedly connect the first mounting member 21 to the first connecting portion 11, that is, the connecting rod 1 and the mount 2 are securely connected by the threads, which makes the assembly and disassembly convenient; and the fastening screw 3 passes through the first mounting member 21 and the first connecting portion 11 to further realize the secure connection between the connecting rod 1 and the mount 2 and ensure that the fan lamp may not loosen or fall off during long-term use, which is also applicable to large-sized fan lamps with forward and reverse rotation functions, thus ensuring the safety of use.

The outer wall 41 of the traditional lamp base 4 is a threaded surface. In the mounting structure 100 for the fan lamp according to the present application, the outer wall 41 of the lamp base 4 is a smooth surface. This arrangement ensures that a user cannot mistakenly mount the lamp base 4 directly on a lamp holder on the wall. Instead, the fan lamp can only be mounted by using structures such as the mount 2 and the connecting rod 1 provided in the present application, preventing user misoperation and thus ensuring the stability and safety of use.

In the mounting structure 100 for the fan lamp according to the present application, the connecting rod 1 includes the second connecting portion 12, and the anti-slip pattern 121 are provided on the periphery of the second connecting portion 12, which facilitates gripping and screwing by the user.

In the mounting structure 100 for the fan lamp according to the present application, each of the external thread 111 and the internal thread 211 is of a double-thread and double-pitch structure, which takes into account the installation efficiency and the connection reliability, ensuring both quick assembly and connection strength.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above description is merely specific implementations of the present application, but is not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

The invention claimed is:

1. A mounting structure for a fan lamp, comprising:

a connecting rod comprising a first connecting portion, wherein the first connecting portion is a cylinder, an external thread is arranged on a periphery of the cylinder, a projecting ring is provided at a top of the cylinder, there is a gap between the projecting ring and the external thread, and at least one blind hole is arranged in the first connecting portion at the gap;

a mount comprising a first mounting member and a second mounting member connected to the first mounting member, the first mounting member being internally hollow; an internal thread being provided on the first mounting member corresponding to the first connecting portion, the external thread being threadedly engaged with the internal thread to threadedly connect the first mounting member to the first connecting portion, and an end of the second mounting member away from the first mounting member being used for fixing to a wall; and a fastening screw passing through the first mounting member and threadedly engaging the at least one blind hole in the first connecting portion at the gap to securely connect the connecting rod to the mount.

2. The mounting structure for the fan lamp according to claim 1, further comprising a lamp base:

wherein the connecting rod comprises a protruding column, the protruding column is connected to the first connecting portion, the protruding column is arranged toward the mount, the lamp base is mounted on the protruding column, and an outer wall of the lamp base is a smooth surface.

3. The mounting structure for the fan lamp according to claim 2, wherein a conductive elastic piece is mounted in the mount, and when the first mounting member is threadedly connected to the first connecting portion, the lamp base abuts against the conductive elastic piece to electrically connect the lamp base to the conductive elastic piece.

4. The mounting structure for the fan lamp according to claim 1, wherein there are two fastening screws, the first mounting member is an internally hollow barrel, two through holes are provided in a side wall of the barrel, the at least one blind hole comprises two blind holes, the two blind holes being provided in the first connecting portion corresponding to the two through holes, and the fastening screws sequentially pass through and are threadedly connected to the through holes and the blind holes.

5. The mounting structure for the fan lamp according to claim 4, wherein the two fastening screws are arranged on two opposite sides of the first mounting member, respectively.

6. The mounting structure for the fan lamp according to claim 1, wherein the connecting rod further comprises a second connecting portion, the second connecting portion is connected to an end of the first connecting portion away from the mount, and an anti-slip pattern is provided on a periphery of the second connecting portion.

7. The mounting structure for the fan lamp according to claim 6, wherein the second connecting portion is of a cylindrical structure, and the second connecting portion has a greater diameter than the first connecting portion.

8. The mounting structure for the fan lamp according to claim 1, wherein the second mounting member is of a disk-shaped structure, and a plurality of screw mounting positions are provided on the second mounting member for fixing the second mounting member to the wall.

9. The mounting structure for the fan lamp according to claim 1, wherein each of the external thread and the internal thread are of a double-thread and double-pitch structure.

* * * * *